J. STEC.
TRUNDLE WHIRLIGIG TOY.
APPLICATION FILED APR. 2, 1914.

1,104,227.

Patented July 21, 1914.

2 SHEETS—SHEET 1.

Witnesses
Jos. A. Ryan
S. L. Tazuiewicz

Inventor
John Stec
By A. M. Wilson
Attorney

J. STEC.
TRUNDLE WHIRLIGIG TOY.
APPLICATION FILED APR. 2, 1914.
1,104,227.
Patented July 21, 1914.
2 SHEETS—SHEET 2.
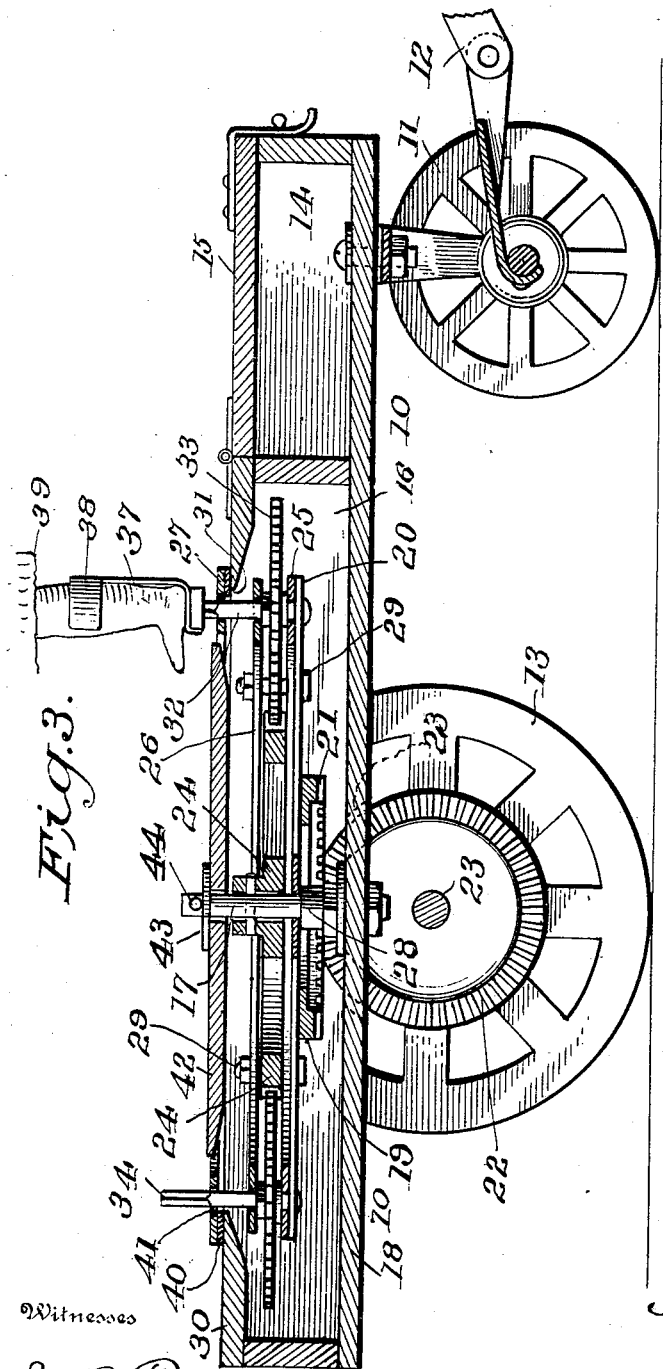
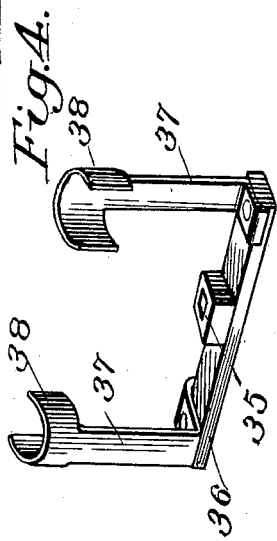
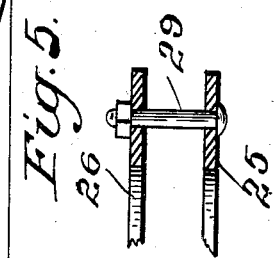
Witnesses
Jos. A. Ryan
S. L. Torosiewicz
Inventor
John Stec
By
N. M. Wilson
Attorney

UNITED STATES PATENT OFFICE.

JOHN STEC, OF MICHIGAN CITY, INDIANA.

TRUNDLE WHIRLIGIG TOY.

1,104,227. Specification of Letters Patent. Patented July 21, 1914.

Application filed April 2, 1914. Serial No. 829,018.

*To all whom it may concern:*

Be it known that I, JOHN STEC, a subject of the Emperor of Austria-Hungary, residing at Michigan City, in the county of Laporte and State of Indiana, have invented certain new and useful Improvements in Trundle Whirligig Toys, of which the following is a specification.

This invention relates to certain new and useful improvements in trundle whirligig toys.

The primary object of this invention is to provide a toy having a cart member adapted to be drawn by a child and having its ground wheels operating as a propelling means for a whirligig or merry-go-round device mounted upon the cart.

A further object is to provide the mounting of a plurality of figures or images such as dolls upon a cart adapted for traveling in a circular path upon the cart while individually revolving during such circuitous travel.

A further object is to provide a trundle device having its traction wheels adapted for imparting a circuitous travel to doll figures and to simultaneously therewith turn said figures revolubly around one another.

With these general objects in view and others that will appear as the nature of the invention is better understood, the same consists in the novel combination and arrangement of parts hereinafter more fully described, illustrated in the accompanying drawings, and pointed out in the appended claims.

Figure 1:
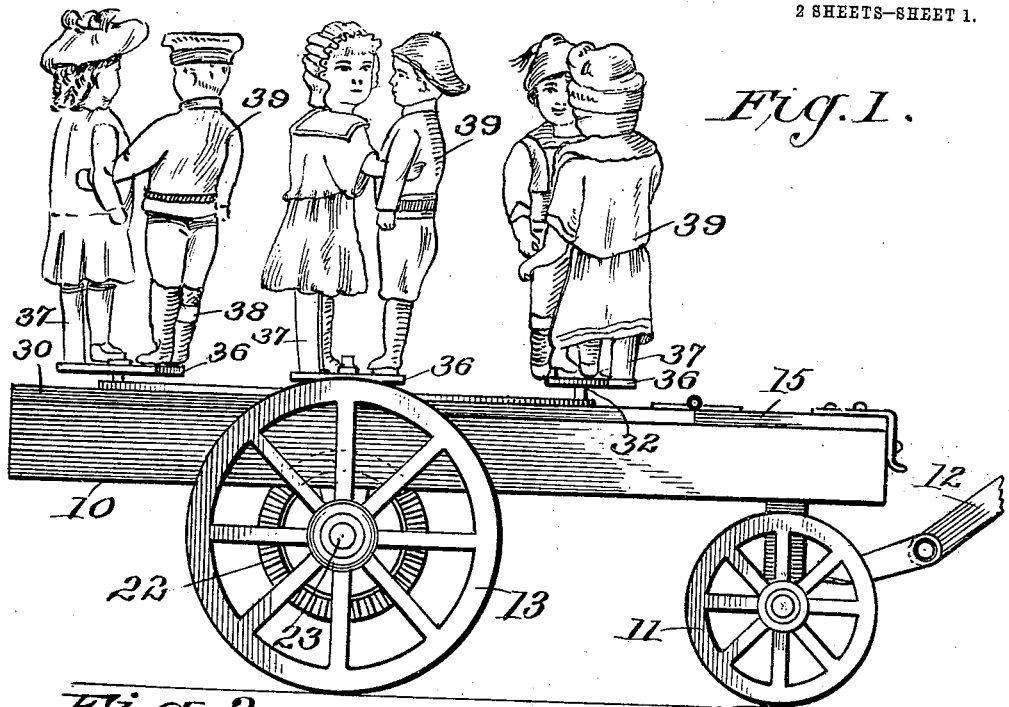
Figure 2:
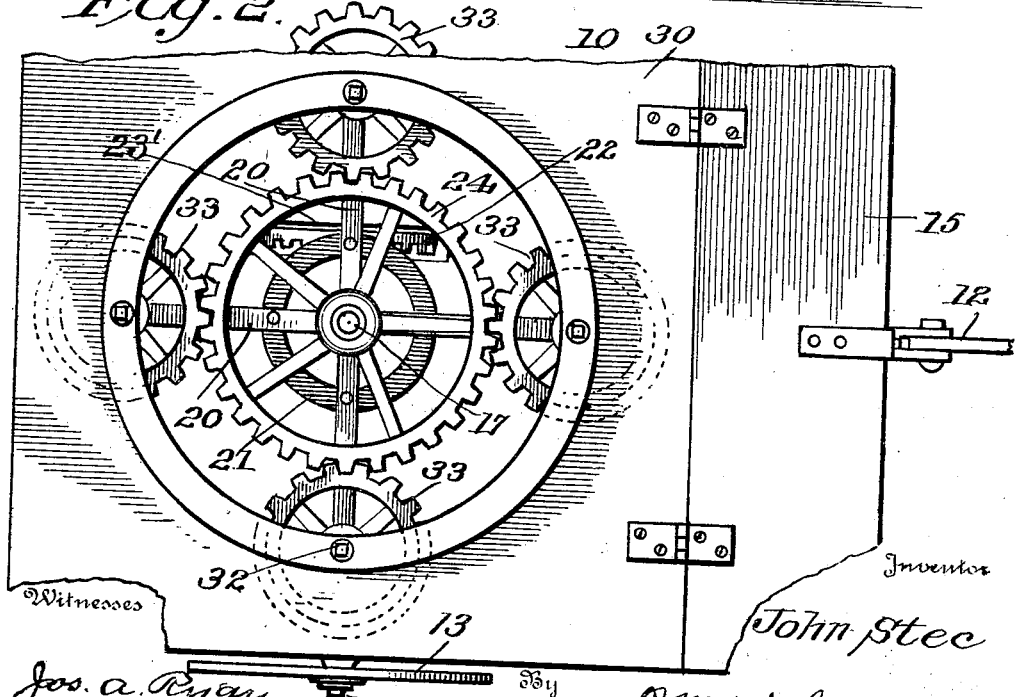

In the drawings forming a part of this application and in which like designating characters refer to corresponding parts throughout the several views:—Figure 1 is a side elevation of the device illustrating six doll figures operatively positioned thereon. Fig. 2 is a top plan view of the same partly broken away, and with the doll figures and central stationary platform removed. Fig. 3 is a longitudinal vertical central sectional view thereof. Fig. 4 is a perspective view of one of the doll-mounting brackets, and, Fig. 5 is a detailed transverse sectional view through one side of a portion of the two lower rings of the traveling platform.

Referring more in detail to the drawings, the device, it will be noted, primarily consists of the trundle cart 10 having front wheels 11, a pulling tongue 12 and rear wheels 13, while a receptacle 14 is provided in the forward portion thereof having a closure lid 15 and the entire remaining portion of the cart consists of the chamber 16 for receiving the operating mechanism hereinafter described.

A central post or axle 17 is rigidly mounted substantially centrally upon the cart bottom 18 and is provided with a gear or pinion 19 revolubly mounted thereon and having a plurality of outwardly-extending radial spokes 20. The gear 19 is provided with bottom teeth 21 meshing with the teeth of a vertically-positioned gear 22 rigidly secured for revolving with the rear axle 23 of the cart and projecting through the slot 23' into said chamber 16, and whereby the drawing of the cart operates to turn the rear wheels 13, thereby revolving the gears 22 and 19. A gear wheel or circular toothed rack 24 is rigidly mounted upon the post or axle 17 while a revolving platform is provided consisting of three annular rings 25, 26, and 27 arranged one above the other at the outer extremities of the spokes 20, the lower ring 25 forming substantially the outer rim of a wheel having spokes 20 and positioned concentric with the gear 19 and its axle 17 and which elements are seated upon the collar 28 of the said axle.

The lower two rings 25 and 26 are secured together at intervals by bolts 29 and are positioned to revolve within the chamber 16 and beneath the top 30 thereof, which top is provided with a circular opening 31. Upwardly projecting shafts 32 are journaled through the rings 25 and 26 at the point of termination of the spokes 20 and have fixed thereon between the rings 25 and 26 the gears 33, which latter gears are in permanent mesh with the stationary gear 24. The upper ends of the shafts 32 are squared as at 34 to receive the square perforations 35 of the base blocks 36 of the image-mounting devices shown in Fig. 4. Upwardly-extending brackets 37 are mounted at each end of the blocks 36 and provided with resilient clasps 38 at their tops, each being adapted to rigidly mount a doll figure 39 therein by resiliently clamping the leg of such figure as best shown in Fig. 3.

The upper ring 27 is positioned above the top 30 of the cart and is preferably provided with an annular cushion 40 on its end surfaces for reducing the friction incident to an engagement with the cart top upon a movement of said ring 27, which latter constitutes the traveling platform top of the device, and is provided with openings 41 for receiving the shafts 32 therethrough and whereby movement is imparted to the platform and above which platform the figures 39 are mounted as hereinbefore described.

A stationary central platform 42 consists of a circular disk having a central opening 43 for receiving the stationary axle 17 therethrough while said stationary platform is retained in position by the pin 44 projecting through the upper free end of said axle 16.

In operating the device, the ground wheels 13 are revolved when the child pulls the cart during the travel thereof, and thus revolves the gear 19 with its spokes 20 and the shafts 32 carried thereby, while the gears 33 being secured to said shafts and meshing with the stationary gear 24, results in revolving the shaft 32 individually upon their own axes simultaneously with their rotation in a circular path around the fixed axle 17. With the doll figures 39 secured to the tops of the shafts 32, it will be evident that while the figures and the platform 27 are traveling around upon the top of the cart, such figures are also being individually revolved by a revolution of the mounting blocks 36 by means of the shafts 32. It will be seen also that the central disk platform 42 is stationary at all times so that viewing the toy from above during its operation, only discloses a movement in the traveling platform top 27 and the doll figures 39.

While the forms of the invention herein shown and described are what are believed to be preferable embodiments thereof, it is nevertheless to be understood that various forms and modifications may be had without departing from the spirit and scope of the invention as claimed.

What is claimed as new is:—

1. A device of the class described, comprising a wagon having revoluble ground wheels and a rear axle, a gear secured to said axle, a vertical stationary axle upon said wagon, a pinion revolubly-mounted upon said stationary axle and meshing with said gear and having outwardly-projecting spokes, rings rigidly secured to the ends of said spokes, upwardly-projecting shafts journaled in said rings, a circular rack fixed to said stationary axle, gears upon said shafts meshing with the teeth of said rack, doll figures rigidly secured to the tops of said shafts, and a central stationary platform secured to said stationary axle centrally of the path of travel of said shafts around said stationary axle upon a movement of said cart.

2. A device of the class described, comprising in combination with a cart having a chamber therein and a circular opening in the top of the cart, wheels upon said cart, an axle revoluble with said wheels and having the cart mounted thereon, a gear secured to said axle, a stationary axle mounted upon the bottom of said cart and vertically positioned centrally of the top opening of the cart, a pinion revolubly-mounted upon said stationary axle meshing with the gear on said wheel supporting axle, said pinion having outwardly projecting spokes, two rings in vertical alinement with each other and spaced apart and secured to the outer ends of said spokes and concentric with said stationary axle, vertical shafts journaled in said rings, a circular toothed rack secured to said stationary shaft, gears secured to said vertical shafts between said rings and in constant engagement with the teeth of said circular rack, doll figures removably mounted upon the upper ends of said vertical shafts and adapted for revolution therewith, a platform ring secured to said vertical shafts and positioned above the top of the cart, and a disk within said platform ring fixedly mounted upon said stationary shaft.

In testimony whereof I affix my signature in presence of two witnesses.

JOHN STEC.

Witnesses:

STEPHAN MIKOS,
SYLVESTER KOMASINSKI.

Copies of this patent may be obtained for five cents each, by addressing the "Commissioner of Patents, Washington, D. C."